Patented Dec. 23, 1941

2,266,822

UNITED STATES PATENT OFFICE 2,266,822

DISAZO DYES

Chiles E. Sparks and James W. Libby, Jr., Wilmington, Del., assignors to E. I. du Pont de Nemours & Company, Wilmington, Del., a corporation of Delaware No Drawing. Application July 12, 1940, Serial No. 345,170

6 Claims. (Cl. 260—160)

This invention relates to new water soluble azo compounds which have substantivity to cotton, regenerated cellulose and similar dyeable cellulosic fibers, to insoluble azo compounds which can be produced from said soluble compounds, to colored combinations of fibers with said insoluble compounds and to processes of making said compounds and compositions. More particularly the first components of said soluble azo compounds can be represented by the symbol $x$ which consist of a type of phenoxy-alkacyldiamines and the second components can be represented by the symbol $y$ which are a type of aryl amines. The soluble compounds which can be represented by the symbol $x \Longrightarrow y_2$ are useful for various purposes, such as bases for making other new direct azo dyes, as bases for making new insoluble azo compounds and as bases for developed dyeings since they are capable of tetrazotization on the fiber and of development with suitable azo dye coupling components.

Various disazo compounds having substantivity for cotton and regenerated cellulose and which can be tetrazotized on the fiber and coupled with coupling components to form dyeings of excellent fastness and good insolubility are known, but in general the dyeings developed from such substantive tetrazotizable compounds do not have as good brightness as is desired.

It is among the objects of this invention to provide disazo dyes which are substantive to cotton and regenerated cellulose and which contain terminal primary aryl amino groups. Another object of the invention is to provide such substantive compounds which will give developed dyeings in bright shades, improved washing fastness, good discharge properties and other properties desired in such dyeings, when they are tetrazotized on the fiber and coupled with suitable coupling components. Another object of the invention is to provide improved dyeings resulting from the tetrazotization and development of the described direct dyeings. Other objects of the invention will be apparent from the following description.

The objects of the invention are attained in general by tetrazotizing a compound $x$ and coupling with two equivalents the compound $y$. The fiber is dyed with compound $x \Longrightarrow y_2$ and tetrazotized thereon. Finally the latter tetrazotized dye is coupled on the fiber with an azo dye coupling component which is devoid of solubilizing groups.

In the general formula $x$ is a compound of the group represented by the formulae

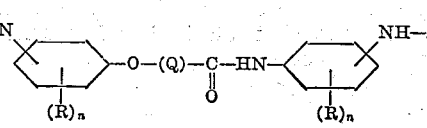

and

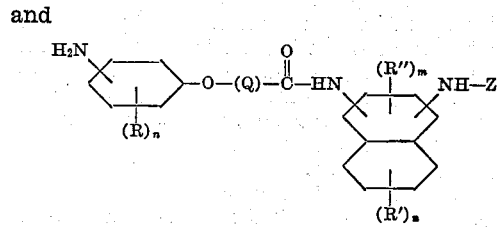

in which Q is the radical of a straight or branched chain aliphatic hydrocarbon compound containing 1 to 6 carbon atoms in the chain; R is from a group consisting of hydrogen, alkyl, alkoxy, halogen, sulfonic acid and carboxyl; $n$ is 1 to 2; R' is from a group consisting of hydrogen, halogen, sulfonic acid and carboxy; Z is one of a group consisting of hydrogen and the group

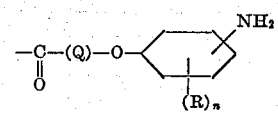

R" is one of a group consisting of hydrogen, halogen, alkyl and alkoxy; and $m$ is 1 to 2.

The symbol $y$ in the general formula represents amine substituted coupling components of the benzene and naphthalene series represented by the formulae

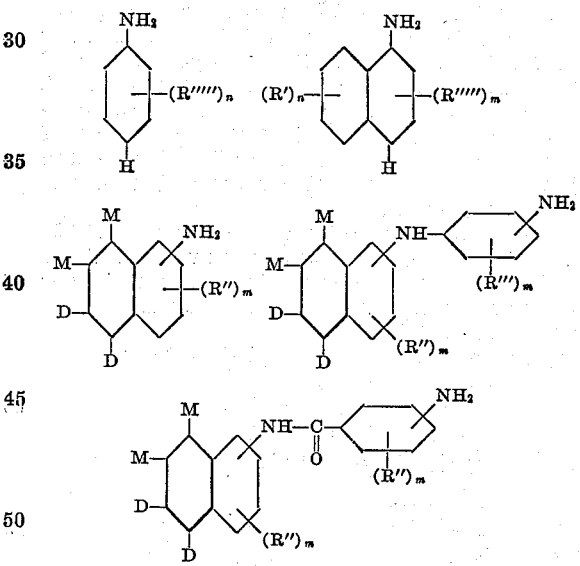

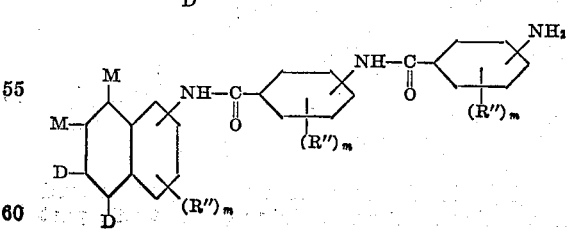

and

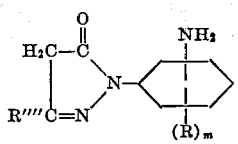

in which R, R' and R'' represent the groups above described; H- represents an open coupling position; R''' is one of a group consisting of hydrogen, carboxy and sulfonic acid; R'''' is one of a group consisting of methyl and carboxyl; R''''' is one of a group consisting of hydrogen, alkyl and alkoxy; one D is hydroxy and the other is hydrogen; M which is meta to hydroxy is sulfonic acid and the other M is hydrogen. The components of the above types must be chosen so that the disazo diamino compound contains at least one solubilizing group, such as carboxyl or sulfonic acid, but more than one solubilizing group may be present.

The invention will be more fully set forth in the following more detailed description which includes examples that are given as illustrative embodiments of the invention and not as limitations thereof. Parts are expressed in parts by weight unless otherwise noted.

*Example I*

A slurry was made by adding 12.9 parts of 3-(4'-amino-phenoxy-acetylamino)-1-amino-benzene to 300 parts of water and 9.1 parts of hydrochloric acid were added with stirring until the solids were completely in solution. The solution was cooled to 0° C. by adding ice and then tetrazotized by adding 6.9 parts of sodium nitrite with agitation. A temperature of 0-5° C. and a distinct test for excess nitrite were maintained for one-half hour.

A solution which gave a mild test for alkali on Brilliant yellow paper was made by dissolving 37.7 parts of 2-(3'-amino-benzoylamino)-5-naphthol-7-sulfonic acid in 400 parts of water and adding ammonia. This solution was cooled to 0° C. and 31.8 parts of soda ash were added. While maintaining good agitation and the temperature between 0° and 5° C. the solution of the tetrazo was slowly added to this solution and the mixture was stirred one hour after all the tetrazo has been added.

The product was isolated by heating to 60°–65° C. and slowly salting to 5% on the volume. After salting the solution was stirred one-half hour longer and filtered. The filter cake was dried in an oven at 70° C.

The compound is represented by the formula

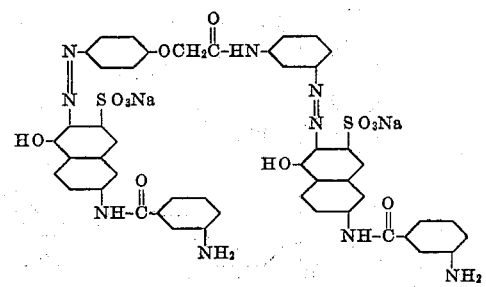

Five parts of cotton piece goods were entered in a water solution containing one-tenth part of the dye and dyed in the usual manner. The dyed fabric was rinsed in cold water and put into 200 parts of water at 20° C. The compound was tetrazotized on the fiber by the action of three-tenths parts of sodium nitrite and four-tenths parts of sulfuric acid which were dissolved in the water and the dyed fabric was then rinsed in cold water. One-tenth part of beta-naphthol was dissolved in 200 parts of water and one twentieth part of caustic soda. For development, the rinsed piece was entered into this solution with rapid stirring. After 15 minutes it was removed, rinsed in cold water and dried. The dyeing was a bright scarlet shade with excellent washing fastness and discharge properties.

*Example II*

By following the procedure of Example I and using 12.9 parts of 4-(4'-amino-phenoxy-acetylamino)-1-amino benzene instead of 12.9 parts of 3-(4'-amino-phenoxy-acetylamino)-1-aminobenzene the product was produced which is represented by the formula

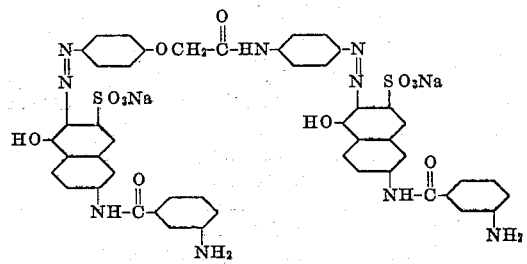

When dyed on cotton fiber and developed with beta-naphthol in the usual way, the dyeing was a bright red shade with excellent washing fastness and discharge properties.

*Example III*

When following the procedure of Example I and using 25.2 parts of 1-amino-5-naphthol-7-sulfonic acid in place of 37.7 parts of 2-(3'-amino-benzoylamino)-5-naphthol-7-sulfonic acid the product represented by the following formula was produced.

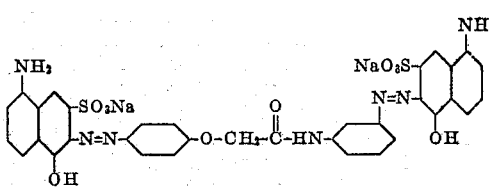

When dyed on cotton fiber and developed with beta-naphthol in the usual way the dyeing was a rubine shade with excellent washing fastness and discharge properties.

Other compounds set forth in the following examples have been prepared by methods similar to those of the foregoing examples. However, it is to be understood that the method of preparation of these compounds as well as those of the foregoing examples is not limited by the specific details heretofore particularized, and that modifications in the details of such methods which are understood by those skilled in the art can be made.

| Example | Combination | Developed with— | Shade |
|---|---|---|---|
| IV | 4,-(4'-amino-phenoxy-acetylamino)-1-amino-benzene ⇌ (1-(3'-amino-phenyl)-5-pyrazolone-3-carboxylic acid)₂. | Beta naphthol | Orange. |
| V | 4-(4'-amino-phenoxy-acetylamino)-1-amino-benzene ⇌ (2-(4'-amino-3'-sulfo-phenylamino)-5-naphthol-7-sulfonic acid)₂. | do | Violet. |
| VI | 3-(4'-amino-phenoxy-acetylamino)-1-amino-benzene ⇌ (1-(3'-aminophenyl)-5-pyrazolone-3-carboxylic acid)₂. | do | Orange. |
| VII | 3-(4'-amino-phenoxy-acetylamino)-1-amino-benzene ⇌ (2-(4'-amino-3'-sulfo-phenylamino)-5-naphthol-7-sulfonic acid)₂. | do | Violet. |
| VIII | 4-(4'-amino-phenoxy-acetylamino)-1-amino-naphthalene ⇌ (1-(3'-amino-phenyl)-5-pyrazolone-3-carboxylic acid)₂. | do | Red. |
| IX | 4-(4'-amino-phenoxy-acetylamino)-1-amino-naphthalene ⇌ (2-(4'-amino-3'-sulfo-phenylamino)-5-naphthol-7-sulfonic acid)₂. | do | Violet. |
| X | 1,3-di-(4'-amino-phenoxy-acetylamino)-benzene ⇌ (1-(3'-aminophenyl)-5-pyrazolone-3-carboxylic acid)₂. | do | Orange. |
| XI | 1,3-di-(4'-amino-phenoxy-acetylamino)-benzene ⇌ (2-(4'-amino-3'-sulfo-phenyl-amino)-5-naphthol-7-sulfonic acid)₂. | do | Violet. |
| XII | 1-4-di-(4'-amino-phenoxy-acetylamino)-naphthalene-6-sulfonic acid ⇌ (2-(3'-amino-benzoylamino)-5-naphthol-7-sulfonic acid)₂. | do | Red brown. |
| XIII | 1-4-di-(4'-amino-phenoxy-acetylamino)-naphthalene-6-sulfonic acid ⇌ (2-amino-5-naphthol-7-sulfonic acid)₂. | do | Violet. |
| XIV | 1-3-di-(4'-amino-phenoxy-acetylamino)-benzene-5-sulfonic acid ⇌ (1-(3'-aminophenyl)-5-pyrazolone-3-carboxylic acid)₂. | do | Orange. |
| XV | 1-3-di-(4'-amino-phenoxy-acetylamino)-benzene-5-sulfonic acid ⇌ (2-(4'-amino-3'-sulfo-phenylamino)-5-naphthol-7-sulfonic acid)₂. | do | Violet. |
| XVI | 1-3-di-(4'-amino-phenoxy-acetylamino)-benzene-5-sulfonic acid ⇌ (2-(3'-amino-benzoylamino)-5-naphthol-7-sulfonic acid)₂. | do | Scarlet. |
| XVII | 1-3-di-(4'-amino-phenoxy-acetylamino)-benzene-5-sulfonic acid ⇌ (2-amino-5-naphthol-7-sulfonic acid)₂. | do | Chocolate brown. |
| XVIII | 1-3-di-(4'-amino-phenoxy-acetylamino)-benzene-5-sulfonic acid ⇌ (1-amino-5-naphthol-7-sulfonic acid)₂. | do | Rubine. |
| XIX | 4-(4'-amino-phenoxy-acetylamino)-1-amino-benzene ⇌ (2-(3'-amino-benzoylamino)-5-naphthol-7-sulfonic acid)₂. | do | Red. |
| XX | 4-(4'-amino-phenoxy-acetylamino)-1-amino-benzene ⇌ (1-amino-5-naphthol-7-sulfonic acid)₂. | do | Rubine. |
| XXI | 4-(4'-amino-phenoxy-acetylamino)-1-amino-benzene ⇌ (2-amino-5-naphthol-7-sulfonic acid)₂. | do | Chocolate brown. |
| XXII | 3-(4'-amino-phenoxy-acetylamino)-1-amino-benzene ⇌ (2-(3'-amino-benzoylamino)-5-naphthol-7-sulfonic acid)₂. | do | Scarlet. |
| XXIII | 3-(4'-amino-phenoxy-acetylamino)-1-amino-benzene ⇌ (1-amino-5-naphthol-7-sulfonic acid)₂. | do | Rubine. |
| XXIV | 3-(4'-amino-phenoxy-acetylamino)-1-amino-benzene ⇌ (2-amino-5-naphthol-7-sulfonic acid)₂. | do | Do. |
| XXV | 4-(4'-amino-phenoxy-acetylamino)-1-amino-naphthalene ⇌ (2-(3'-amino-benzoylamino)-5-naphthol-7-sulfonic acid)₂. | do | Bordeaux. |
| XXVI | 4-(4'-amino-phenoxy-acetylamino)-1-amino-naphthalene ⇌ (1-amino-5-naphthol-7-sulfonic acid)₂. | do | Violet. |
| XXVII | 4-(4'-amino-phenoxy-acetyl-amino)-naphthalene-7-sulfonic acid)₂ ⇌ (2-amino-5-naphthol-7-sulfonic acid)₂. | do | Do. |
| XXVIII | 1,3-di-(4'-amino-phenoxy-acetylamino)-benzene ⇌ (2-(3'-amino-benzoyl-amino)-5-naphthol-7-sulfonic acid)₂. | do | Red. |
| XXIX | 1,3-di-(4'-amino-phenoxy-acetylamino)-benzene ⇌ (2-amino-5-naphthol-7-sulfonic acid)₂. | do | Red violet. |
| XXX | 1,3-di-(4'-amino-phenoxy-acetylamino)-benzene ⇌ (1-amino-5-naphthol-7-sulfonic acid)₂. | do | Violet. |
| XXXI | 1-(4'amino-phenoxy-acetylamino)-4-amino-benzene ⇌ [1-(3'-amino-phenyl)-5-pyrazolone-3-carboxylic acid]₂. | Phenyl-methyl-pyrazolone. | Red yellow. |
| XXXII | do | Meta-toluylene-diamine. | Red brown. |
| XXXIII | do | Aceto-acetanilide. | Red yellow. |
| XXXIV | 1-(4'-amino-phenoxy-acetylamino)-3-amino-benzene ⇌ [2-(3'-amino-benzoylamino)-5-naphthol-7-sulfonic acid]₂. | Phenylmethyl-pyrazolone. | Scarlet. |
| XXXV | do | Metatoluylene-diamine. | Red. |
| XXXVI | do | Acetoacetanilide. | Scarlet. |
| XXXVII | 1-(4'-amino-phenoxy-acetylamino)-4-amino-benzene ⇌ (1-amino-5-naphthol-7-sulfonic acid)₂. | Phenyl-methyl-pyrazolone. | Red brown. |
| XXXVIII | do | Meta-toluylene-diamine. | Brown. |
| XXXIX | do | Aceto-acetanilide. | Red brown. |
| XL | 1-(4'-amino-phenoxy-acetylamino)-3-amino-benzene ⇌ [2-(4'amino-3'-sulfo-phenylamino)-5-naphthol-7-sulfonic acid]₂. | Phenyl-methyl-pyrazolone. | Bordeaux. |
| XLI | do | Meta-toluylene-diamine. | Violet. |
| XLII | 1-(4'-amino-phenoxy-acetylamino)-3-amino-benzene ⇌ [2-(4'amino-3'-sulfo-phenylamino)-5-naphthol-7-sulfonic acid]₂. | Aceto-acetanilide. | Bordeaux. |

As other illustrations of x components which can be used to make compounds having properties similar to the foregoing, the following are mentioned: 3-(4'-aminophenoxy-acetylamino)-1-aminobenzene, 4-(3'-amino-phenoxy-acetylamino)-1-aminobenzene, 1,3-di(4'-amino-phenoxy-acetylamino)-benzene, 3-(alpha-(4'-amino-2'-methoxy-phenoxy)-propionyl-amino)-1-amino-benzene, 4-(alpha-(5'-amino-2'-methyl-phenoxy)-butyryl-amino)-1-aminobenzene, 4-(4'-amino-phenoxy-acetylamino)-1-amino-naphthalene, 1,4-di-(3'-amino-phenoxy-acetylamino)-naphthalene-7-sulfonic acid, 3-(4'-amino-2'-chloro-phenoxy-acetylamino)-1-amino-benzene, 3-[alpha(2'-methyl-4'-amino-phenoxy-propionylamino)]-1-amino-benzene-3-sulfonic acid, 3-[beta-(2'-sulfo-4'-amino-phenoxy-propionylamino)]-1-aminobenzene, 4-[gamma-(2'-carboxy-4'-amino-phenoxy butyryl-amino)]-1-amino-benzene, 4-[alpha-(3'-chloro-4'-amino-phenoxy-caproyl-amino)]-1-amino-2,5-dimethoxy-benzene, 1,3-di(2'-chloro-4'-amino-5'-methyl-phenoxy-acetylamino)-benzene, 1-(4'-amino-phenoxy-acetylamino)-2-methoxy-4-amino-naphthalene-6-sulfonic acid, 1,4-di[alpha-(3'-amino-phenoxy-butyrylamino)]naphthalene-5-carboxylic acid, 1-(4'-aminophenoxy-acetylamino)-4-amino-5-methoxy-naphthalene-7-sulfonic acid, 2-(3'-amino-phenoxy-acetylamino)-4-amino-naphthalene-6-sulfonic acid, 1-(4'-amino-phenoxy-acetylamino)-4-amino-8-chloro-naphthalene-6-carboxylic acid, 1-(3'-amino-6'-methyl-phenoxyacetylamino)-3-amino-benzene-5-carboxylic acid, 1-[alpha-(4'-amino-phenoxy-acetylamino)]-4-amino-2,5-dichloro-benzene and 1-(2'-amino-phenoxy-acetylamino)-3-amino-benzene.

As other illustrations of y components which can be used to practice the invention heretofore set forth, the following are mentioned: 1-amino-3-methyl-benzene, 1-amino-naphthalene-6-sulfonic acid, 2-amino-5-naphthol-7-sulfonic acid, 1-amino-5-naphthol-7-sulfonic acid, 2-amino-8-naphthol-6-sulfonic acid, 2-amino-8-naphthol-3,6-disulfonic acid, 1-(4'-amino-3'-sulfo-phenylamino)-5-naphthol-7-sulfonic acid, 1-(3'-amino-benzoyl-amino)-5-naphthol-7-sulfonic acid, 1-(3'-amino-phenyl)-5-pyrazolone - 3 - carboxylic acid, aniline, 1-amino-2-methoxy-5-methyl-benzene, 1-amino-2-methoxy-naphthalene-6-sulfonic acid, 1-amino-8-chloro-naphthalene-6-sulfonic acid, 1-amino-naphthalene-6-carboxylic acid, 2-amino-3-methyl-5-naphthol-7-sulfonic acid, 2-(4'-amino-3'-methyl-5'-sulfo-phenylamino)-5-naphthol-7-sulfonic acid, 2-(3'-amino-5'-sulfo-phenylamino)-5-naphthol-7-sulfonic acid, 2-(3'-amino-4'-ethoxy-benzoylamino)-5-naphthol-7-sulfonic acid, 2-(3'-amino-4'-propoxy-5'-chloro-benzoylamino)-5-naphthol-7-sulfonic acid, 1-(3'-amino-5'-carboxy-phenyl)-5-pyrazolone-3-carboxylic acid, 1-(3'-amino-5'-sulfo-phenyl)-5-pyrazolone-3-carboxylic acid, 1-(3'-amino-4'-chloro-5'-ethyl-phenyl)-5-pyrazolone-3-carboxylic acid, 1-(3'-amino-5'-bromo-benzoylamino)-5-naphthol-7-sulfonic acid, 1-(4'-amino-phenyl)-5-methyl-pyrazolone, and 2-(4'-methoxy-3'-amino-benzolyamino)-5-naphthol-7-sulfonic acid.

The preferred embodiments of the invention are those in which the bridging group of the x component contains the acetylamino group and of these the modifications in which both arylamino radicals are aminobenzene are preferred.

When the soluble diamino disazo compounds are tetrazotized and developed on the fiber the preferred coupling component is beta naphthol, but 1-phenyl-3-methyl-5-pyrazolone, acetoacetanilide or meta-toluylene diamine can be used. Insoluble colors can be made by carrying out in substance the tetrazotization of the diamino disazo compound and the coupling with any of the described coupling components.

When the amino bases of the invention are tetrazotized and developed on fiber, such as cotton or regenerated cellulose with the described coupling components, a variety of shades can be produced and the dyeings in general have excellent washing fastness and good discharge properties.

From the foregoing disclosure it will be recognized that the invention is susceptible of modification without departing from the spirit and scope thereof and it is to be understood that the invention is not restricted to the specific illustrations thereof set forth.

We claim:

1. A compound of the group consisting of the acid, the alkali metal salts and the ammonia salts of a compound which in the form of its acid is represented by the formula Y←X→Y in which X is a compound of the group represented by the formulae

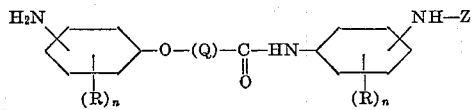

and

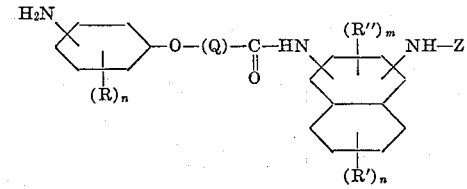

wherein Q represents a radical of the straight and branched chain aliphatic hydrocarbons containing 1 to 6 carbon atoms in the chain; R is from the group consisting of hydrogen, alkyl having 1 to 6 carbons, the corresponding alkoxy groups carboxy, sulfonic acid and halogen; R' is from the group consisting of hydrogen, halogen, carboxyl and sulfonic acid; $n$ is 1 to 2; Z is one of a group consisting of hydrogen and the group represented by the formula

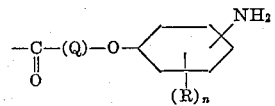

and R'' is from the group consisting of hydrogen, halogen, alkyl having 1 to 6 carbons and the corresponding alkoxy groups; $m$ is 1 to 2; and Y is one of a group represented by the formulae

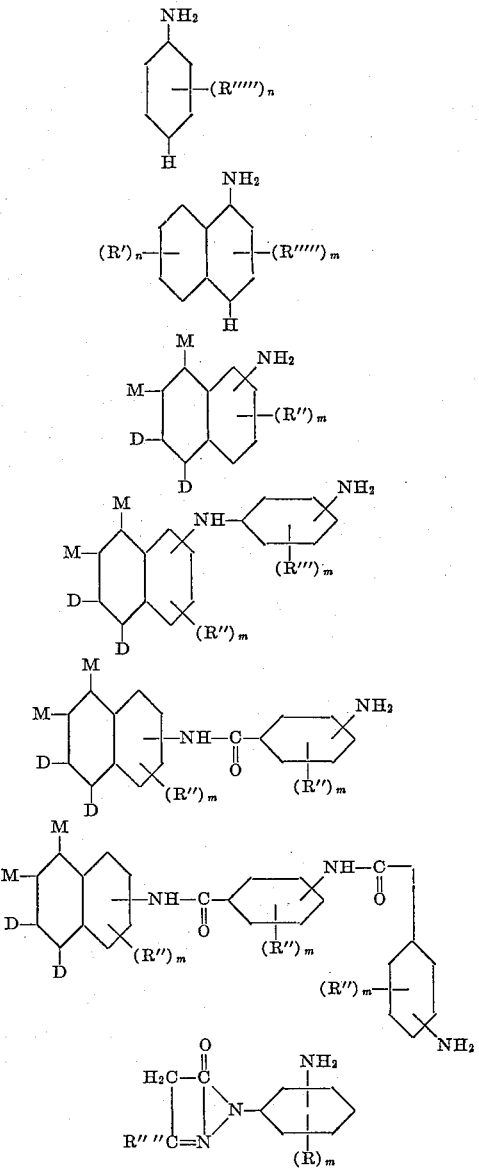

and

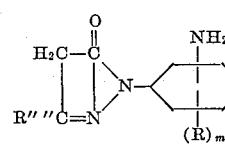

in which —H represents an open coupling position; R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; and M which is meta to hydroxy is sulfonic acid and the other is hydrogen, said compound containing at least one solubilizing group.

2. A compound represented by the formula

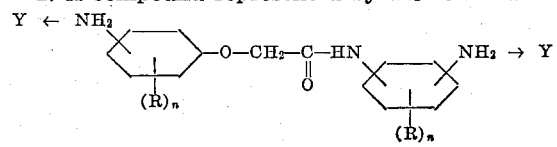

in which R is from the group consisting of hydrogen, alkyl having 1 to 6 carbons, the corresponding alkoxy groups carboxy, sulfonic acid and halogen; $n$ is 1 to 2; and Y is one of a group represented by the formulae

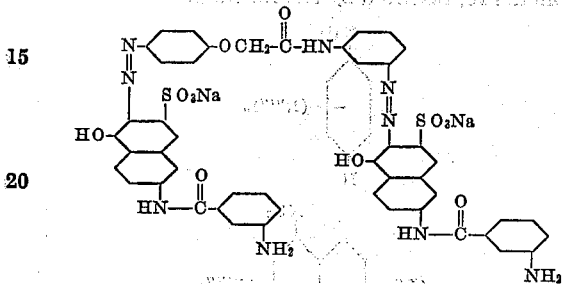

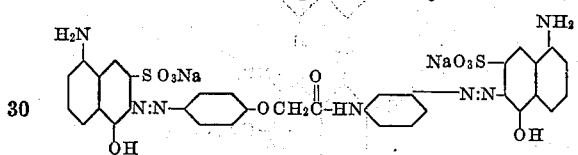

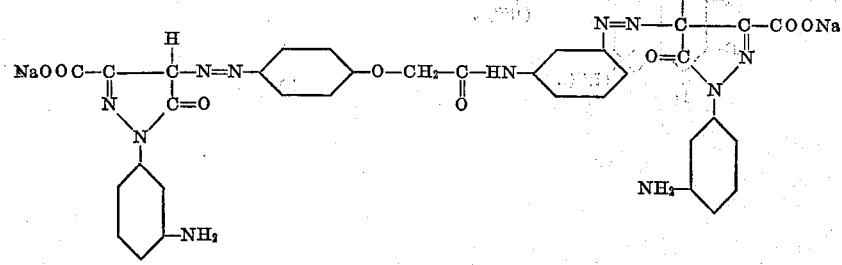

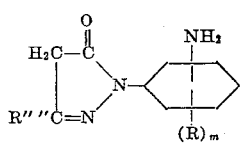

in which —H represents an open coupling position; R' is from the group consisting of hydrogen, halogen, carboxyl and sulfonic acid; R'' is from a group consisting of hydrogen, halogen, alkyl having 1 to 6 carbons and the corresponding alkoxy groups; R''' is one of a group consisting of hydrogen, carboxy, and sulfonic acid; R'''' is one of a group consisting of methyl and carboxy; R''''' is one of a group consisting of hydrogen, alkyl and alkoxy, one D is hydroxy and the other is hydrogen; and M which is meta to hydroxy is sulfonic acid and the other is hydrogen; $m$ is 1 to 2; said compound containing at least one solubilizing group.

3. The compound represented by the formula

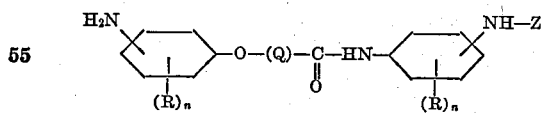

4. The compound represented by the formula

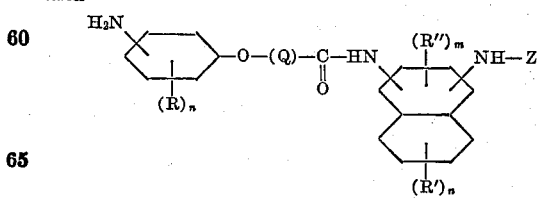

5. The compound represented by the formula

6. The process which comprises tetrazotizing a compound of a group represented by the formulae and wherein Q represents a radical of the straight and branched chain hydrocarbons containing 1 to 6 carbon atoms in the chain; R is from the group consisting of hydrogen, alkyl having 1 to 6 carbons, the corresponding alkoxy groups carboxy, sulfonic acid and halogen; R' is from the group consisting of hydrogen, halogen, carboxyl and sulfonic acid; $n$ is 1 to 2; $m$ is 1 to 2; Z is one of a group consisting of hydrogen and the group represented by the formula

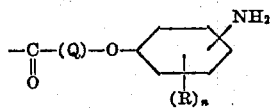

and R" is from the group consisting of hydrogen, halogen, alkyl having 1 to 6 carbons and the corresponding alkoxy groups; and coupling with one of a group of azo dye coupling components represented by the formulae

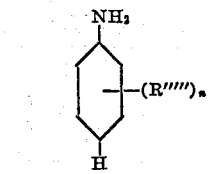

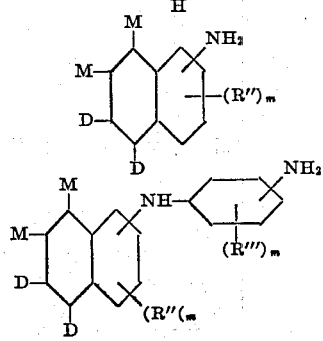

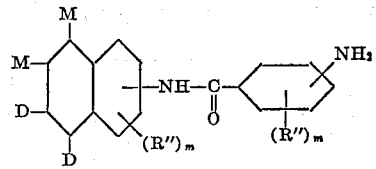

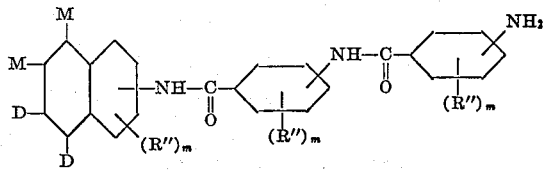

and

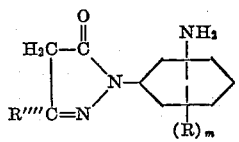

in which —H represents an open coupling position; R''' is one of a group consisting of hydrogen, carboxy and sulfonic acid; R'''' is one of a group consisting of methyl and carboxy; R''''' is one of a group consisting of hydrogen, alkyl and alkoxy; one D is hydroxy and the other is hydrogen; and M which is meta to hydroxy is sulfonic acid and the other is hydrogen; at least one of the components having a solubilizing group.

CHILES E. SPARKS.
JAMES W. LIBBY, JR.

Certificate of Correction

Patent No. 2,266,822.　　　　　　　　　　　　　　　　December 23, 1941.

CHILES E. SPARKS ET AL.

It is hereby certified that errors appear in the printed specification of the above numbered patent requiring correction as follows: Page 4, second column, lines 54 to 58, claim 1, for the portion of the formula reading

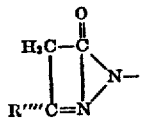

read

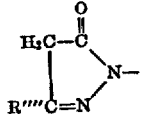

page 5, second column, lines 26 to 32, claim 4, for

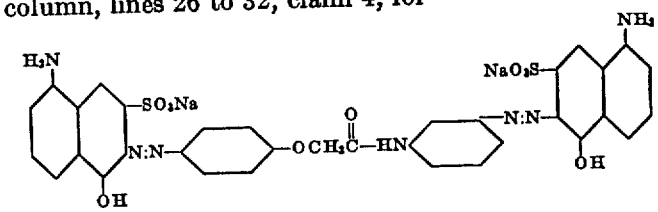

read

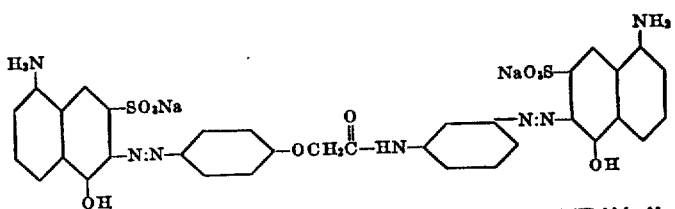

page 6, first column, line 40, claim 6, in the formula for "$(R'')(_m)$" read $(R'')_m$; and that the said Letters Patent should be read with these corrections therein that the same may conform to the record of the case in the Patent Office.

Signed and sealed this 3rd day of March, A. D. 1942.

[SEAL]

HENRY VAN ARSDALE,
*Acting Commissioner of Patents.*